United States Patent
Fujiwara et al.

[11] Patent Number: 5,966,233
[45] Date of Patent: Oct. 12, 1999

[54] INDUCING OR ENHANCING ELECTRO-OPTIC PROPERTIES IN OPTICALLY TRANSMISSIVE MATERIAL WITH SIMULTANEOUS UV IRRADIATION AND ELECTRIC FIELD APPLICATION

[75] Inventors: Takumi Fujiwara, Nagoya, Japan; Danny Wong; Simon Fleming, both of Sydney, Australia; Yuxing Zhao, Chatswood, Australia; Mark Sceats, Sydney, Australia; Simon Poole, Lane Cove, Australia; Graham Town, Erskineville, Australia

[73] Assignee: University of Sydney, Sydney, Australia

[21] Appl. No.: 08/836,837

[22] PCT Filed: Nov. 17, 1995

[86] PCT No.: PCT/AU95/00766

§ 371 Date: Aug. 19, 1997

§ 102(e) Date: Aug. 19, 1997

[87] PCT Pub. No.: WO96/16344

PCT Pub. Date: May 30, 1996

[30] Foreign Application Priority Data

Nov. 18, 1994 [AU] Australia .................. PM9566

[51] Int. Cl.⁶ .............................. G02F 1/01; G02F 1/035; G02B 6/16
[52] U.S. Cl. ........................ 359/240; 359/241; 359/245; 359/321; 264/1.36; 264/1.38; 250/492.1
[58] Field of Search .......................... 385/2, 3; 359/245, 359/251, 254, 240, 241, 321; 264/1.36, 1.37, 1.38; 204/157.15, 157.41, 157.5; 250/492.1

[56] References Cited

U.S. PATENT DOCUMENTS

| | | |
|---|---|---|
| 3,815,973 | 6/1974 | Haussuehl ............... 307/88.3 |
| 3,923,374 | 12/1975 | Martin ...................... 350/96 |
| 3,940,201 | 2/1976 | Micheron et al. ............ 340/173 |
| 4,877,298 | 10/1989 | Teng et al. ................. 307/430 |
| 4,983,324 | 1/1991 | Durr et al. ................. 252/587 |
| 5,212,585 | 5/1993 | Ning ........................ 359/276 |
| 5,239,407 | 8/1993 | Brueck et al. .............. 359/326 |
| 5,247,601 | 9/1993 | Myers et al. ............... 385/122 |
| 5,617,499 | 4/1997 | Brueck et al. .............. 385/122 |

FOREIGN PATENT DOCUMENTS

| | | |
|---|---|---|
| 85364/82 | 1/1984 | Australia . |
| 23059/92 | 1/1993 | Australia . |
| 0028538 | 5/1981 | European Pat. Off. . |
| 0492216 | 7/1992 | European Pat. Off. . |
| 214006 | 9/1994 | German Dem. Rep. . |
| 1141512 | 1/1969 | United Kingdom . |
| 86/04996 | 8/1986 | WIPO . |
| 90/08970 | 8/1990 | WIPO . |
| 93/00605 | 1/1993 | WIPO . |
| 93/18420 | 9/1993 | WIPO . |
| WO 94/10601 | 5/1994 | WIPO ................... 359/245 |

OTHER PUBLICATIONS

Anderson, Dana Z. et al., "Model for second-harmonic generation in glass optical fibers based on asymmetric photoelectron emission from defect sites," *Optics Letters*, 16(11):796–798 (Jun. 1, 1991).

(List continued on next page.)

*Primary Examiner*—Georgia Epps
*Assistant Examiner*—Margaret Burke
*Attorney, Agent, or Firm*—Merchant & Gould P.C.

[57] ABSTRACT

A method of inducing or enhancing the electro-optic properties of an optically transmissive material such as an optical fiber (1) which comprises applying an electric field by means of electrodes (4) to the optical fiber and subjecting the material to UV radiation (9).

74 Claims, 1 Drawing Sheet

OTHER PUBLICATIONS

Bergot, M. V. et al., "Generation of permanent optically induced second–order nonlinearities in optical fibers by poling," *Optics Letters*, 13(7):592–594 (Jul., 1988).

Fujiwars, T. et al., "Electro–optic modulation in germanosilicate fibre with UV–excited poling," *Electronics Letters* 31(7):573–574 (Mar. 30, 1995).

Kazansky, P.G. et al., "Pockels effect in thermally poled silica optical fibres," *Electronics Letters*, 31(1):62–63 (Jan. 5, 1995).

Long, X.C. et al., "Measurement of linear electro–optic effect in temperature/electric–field poled optical fibres," *Electronics Letters*, 30(25):2162–2163 (Dec. 8, 1994).

Long, X.C., et al., "Measurement of the linear electro–optic coefficient in poled amorphous silica," *Optics Letters*, 19(32):1819–1821 (Nov. 15, 1994).

Luksun U. et al., "Generation of permanent second–order susceptibility in lead–silicate glass fibers," *Ionics Research.* estimated publication date:1991.

Myers, R.A. et al., "Large second–order nonlinearity in poled fused silica," *Optics Letters*, 15(22):1732–1734 (Nov. 15, 1991).

Okada, A. et al., "Phase–matched second–harmonic generation in novel corona poled glass waveguides," *Appl. Phys. Lett* 60(23):2853–2855 (Jun. 8, 1992).

Osterberg, U. et al., "Dye laser pumped by Nd:YAG laser pulses frequency doubled in a glass optical fiber," *Optics Lertters* 11(8):516–518 (Aug., 1986).

Stolen, R.H. et al., "Self–organized phase–matched harmonic generation in optical fibers," *Optics Letters*, 12(5):585–587 (Aug., 1987).

Optical Society of America: M.V. Bergot, et al, "Generation of permanent optically induced second–order nonlinearities in optical fibers by poliing".

Journal of physics D: Applied physics (Institute of Physics and the Physical Society, London), Mohjerani et al, "Stability of NLO chromophores in doped polymer films during electric field poling", pp. 1304–1310 Fig. 6.

J.M. Dell et al.; "Erasure of poling induced second order optical nonlinearities in silica by UV exposure"; *Doped Fiber Devices and Systems, SPIE;* 1994; vol. 2289 pp. 185–193.

T. Fujiwara et al.; "Electro–optic modulation in germanosilicate fibre with UV–excited poling"; *Electronics Letters,* Mar. 30, 1995; vol. 31, No. 7, pp. 573–575.

INDUCING OR ENHANCING ELECTRO-OPTIC PROPERTIES IN OPTICALLY TRANSMISSIVE MATERIAL WITH SIMULTANEOUS UV IRRADIATION AND ELECTRIC FIELD APPLICATION

FIELD OF THE INVENTION

This invention relates to a process for inducing or enhancing electro-optic properties in optically transmissive material and to optical devices comprising or incorporating material that has been subjected to such process. More particularly but not exclusively, the present invention relates to a process for producing an optically transmissive material having electro-optic properties for use in an optical waveguide such as an optical fibre.

BACKGROUND OF THE INVENTION

Electro-optic materials, i.e. materials whose refractive index (RI) varies with application of an electric field currently are known, an example of such a material being Lithium Niobate ($LiNbO_3$). The existence of the electro-optic property provides for the development of various optical/light transmitting devices whose RI may be controlled by the application of an electric field.

Lithium Niobate waveguide modulators are commercially available but there are limitations inherent in relation to the existing technology. Fabrication of devices employing Lithium Niobate is complex and the materials are expensive. Its high dielectric constant is not entirely appropriate for the realisation of high speed, low voltage devices and the differences between Lithium Niobate and silica optical fibre both in terms of linear refractive index and of waveguide geometry make low loss coupling to standard fibre systems difficult. Furthermore, at short (e.g. blue) wavelengths lithium niobate suffers from photorefractive damage.

By far the most practical and readily available material for optical devices is silica or silicate glass (referred to herein for convenience as "silica glass" or "glass"), but unfortunately, silica glass displays little or no electro-optic properties.

An attempt has been made to enhance electro-optic properties in doped silica glass devices by heating the devices in the presence of an applied electric field. This has had some effect but the resultant electro-optic effect has proved to be insufficient for practical purposes.

Attempts have also been made at enhancing the electro-optic properties of doped silica glass utilising visible light in the presence of an applied electric field. "Generation of Permanent Optically Induced Second-Order Nonlinearities in Optical Fibers by Poling" by Bergot et al appearing in Optics Letters, Volume 13, No. 7, July 1988 at pages 592–594 (Bergot et al) discusses a process of inducing a second order optical nonlinearity in germanosilicate fibres by applying a transverse DC electric poling field in the presence of a high intensity light. Bergot et al discloses utilising a pulsed laser operating at 485 nm and a CW argon laser operating at 488 nm. It further discloses launching light from these lasers axially into the core of the fibre in the presence of a DC electric field. This has had some effect but again, the resultant electro-optic effect has proved insufficient for practical purposes.

SUMMARY OF THE INVENTION

In contrast, in the present invention, it has been found that, by utilisation of electromagnetic radiation of higher frequencies, for example, ultra violet (UV) substantially improved results are obtained. Further, Bergot et al in utilising lower frequency visible light, allows for the light to be launched axially into the fibre. However, electromagnetic radiation in the UV portion of the spectrum is highly absorbed in silica glass. However, by launching the light transversally into the fibre, the UV light can be caused to have effect in producing an optically transmissive material having enhanced electro-optic properties.

Therefore, the present invention provides a process for inducing or enhancing electro-optic properties in an optically transmissive material and which comprises applying an electric field to the optically transmissive material and subjecting the material to incident electromagnetic radiation in the ultra violet portion of the spectrum.

The present invention further provides an optical device which comprises or includes an optically transmissive material which has been subjected to the above defined process.

The intensity or phase of the UV electromagnetic radiation may be varied either in time or spatially along the device to produce a non-uniform enhanced electrooptic response. Also or alternatively the electric field may be varied either spatially or in time.

The material subjected to this process would normally comprise silica glass and, in a preferred embodiment, the process may be applied directly to a silica glass optical fibre. The wavelength of the electromagnetic radiation used in irradiating an optical fibre must be such that, when irradiated in a transverse direction through the cladding, the cladding of the optical fibre will not totally absorb the radiation, so that the radiation will penetrate, and be substantially absorbed in, the core region of the fibre.

In the preferred embodiment, the electromagnetic radiation is selected such that it interacts strongly with the core of the silica glass optical fibre. Alternatively, the radiation can be selected so that it interacts strongly with the core and a portion of the cladding glass that the propagating mode will extend into. In order for a strong interaction to take place, the electromagnetic radiation must be absorbed. The absorption edge of silica is deep in the UV (around 160 nm). However, the presence of defects in the silica glass, especially due to doping in the core, results in absorption bands at longer wavelengths. For instance, in germanosilicate optical fibres, strong absorption bands are found at approximately 193 nm and 240 nm. Electromagnetic radiation at these wavelengths will be absorbed significantly. Typically, half the power of the radiation will be absorbed within a few tens or hundreds of wavelengths which is in the order of a typical single mode fibre core diameter. At longer wavelengths, such as that utilised in Bergot et al, the electromagnetic radiation has only a weak interaction with the optical fibre core as the wavelength is spectrally remote from any absorption peak, with the resulting absorption being approximately one million times smaller. Further, when using radiation at a wavelength remote from an absorption peak, light will generally have to propagate a substantial distance along a fibre to create any useful induced effect and that utilising transverse projected radiation through the side of an optical fibre is not practical because of the low level of absorption as the is light transverses the core whose dimensions will be small compared with the absorption length. Therefore, radiation wavelengths as illustrated in Bergot et al produce an impractically small electro-optic effect.

In a preferred embodiment of the process as applied to an optical fibre, the radiation can be selected to lie between 150 nm and 400 nm and, preferably, to lie in the range 150 nm to 350 nm. The important factor is that the radiation wavelength used must be capable of significantly inducing or enhancing the required electro-optic effect when the optical fibre is exposed to the electric field. Expressed in more general terms, the wavelength and the energy of the incident ultra violet electromagnetic radiation can be determined by the glass composition and the type and concentration of dopant(s) within the glass.

The dopant species for inclusion in the silica glass can be selected for optimum enhancement of the electrooptic effect. The range of the preferred dopant(s) includes those commonly used in the manufacture of optical fibre. Such dopant compounds include those capable of being converted to at least one metal oxide selected from groups IA to VA, IB to IVB and the transition metals, rare earths and actinides. Furthermore, $P_2O_5$ is commonly used as a dopant. Typically dopants to be incorporated may be germanium, aluminium, boron and/or rare earths (or lanthanides) such as erbium. Hydrogen is also known to increase the sensitivity of silica and/or silicate glass to electromagnetic radiation and may be introduced by storing the structure in a high pressure hydrogen atmosphere. Other dopants that can be utilised are $H_2O$ and hydroxide ions.

The electric field preferably is applied across at least a part of the region of the material to be exposed to radiation in a direction transverse to the intended direction of propagation of light through the material. Field strengths of around 100 V/$\mu$m may be applied. In the preferred embodiment, as applied to a silica glass fibre, it is possible that field strengths greater than 100 V/$\mu$m may cause dielectric breakdown of the silica but it is possible that much higher field strengths may be applied. In general, a preferred field strength range is 1 V/$\mu$m to 1000 V/$\mu$m, and more preferably, in particular as applied to a silica glass optical fibre, between 10 V/$\mu$m and 150 V/$\mu$m.

In one embodiment of the present invention, as applied to an optical fibre, the application of such high field strengths is facilitated by including electrodes within the optical fibre cladding alongside the doped silica glass core. It has been found in practice that it is preferable to maintain the anode electrode as close as possible to the core of the optical fibre. This appears to give improved poling results.

The provision of electrodes in proximity to the fibre core also facilitates subsequent application of the treated fibre as an electro optic device, the electrodes facilitating application of an electric field to control light transmitting properties of the fibre.

Optical fibre with electrodes embedded in the cladding running close and parallel to the core may be fabricated by:

(i) Drawing fibre with holes running parallel, close and placed diametrically across the core and then inserting fine wires (or other conductors or conducting materials);

(ii) Drawing fibre from a preform with electrodes already in holes running parallel, close and placed diametrically across the core, where the electrode material typically has thermal properties sufficiently close to that of silica to allow both materials to be drawn simultaneously.

In some instances it may be advantageous to have the electrodes non-parallel (with respect to each other and/or the core) and/or the axes of the electrodes may be contained in a plane which is displaced with respect to any plane containing the axis of the core. Furthermore in some applications of the invention more than two electrodes may be employed. There are many applications where multi-core fibre would benefit from this processing technique. It is also preferable that at least one electrode, preferably the anode, is in contact or near contact with the core of the optical fibre. It should be noted that the electrodes may or may not be used as modulating electrodes in a final device. In some applications they may only be present for the sole purpose of applying the poling electric field. A simple example of such an application is utilising the induced electro-optic behaviour for its optical non-linear properties in the area of second harmonic generation. Further, such use will also apply to other optical non-linearities and to quasi-phase matched second harmonic generation in a periodically poled device.

The present invention can also be readily extended to a planar waveguide structure. Application of higher field strength can take place via buried electrodes. Alternatively, high field strength poling may be possible with exposed electrodes. In this case, it may be necessary to apply the electric field in vacuum or with a high pressure gas (for example $SF_6$) to avoid electrical breakdown of the atmosphere. It may also be necessary to treat the surface with a modifier layer to avoid tracking across the surface. A modified atmosphere can also be useful for further enhancement in the processing of the optical fibre embodiment.

Preferably, the electromagnetic radiation and electrical fields are applied simultaneously. Alternatively, it is possible that pulsed electromagnetic radiation and pulsed electric field could be used to induce the electro-optic effect. The pulses of the electromagnetic radiation and electric field may be alternated.

The non-linearity obviously allows an electric field to modify the refractive index of a material. Of course, light itself consists of oscillating electric and magnetic fields. The intrinsic electric field of light can thus also act through the non-linearity to modify the refractive index. This allows for the generation of higher optical harmonics of the light and mixing of light of different frequencies to produce sum and difference frequencies.

A variation on the process enables the production of devices with predetermined tailored electro-optic properties. In one variation, the incident electromagnetic radiation can be varied, for example by variation of the beam position, power, spatial distribution or pulse rate to "write" a specifically tailored structure to produce a desired optical device. Alternatively or additionally, the applied electric field can be varied to produce the desired device properties. Such "tailored" devices can have any number of applications, depending upon the properties incorporated.

The present invention may be applied to materials other than silica or silicate glasses. Other possible optically transmissive materials include fluorozirconate or chalcogenide glasses and optically transmissive plastic material. Different wavelengths and perhaps different dopants may be required.

The invention may be realised in various practical embodiments and be applied to various light transmitting devices, including optical fibres and planar waveguides.

BRIEF DESCRIPTION OF THE DRAWINGS

Features and advantages of the present invention will become apparent from the following description of an embodiment thereof in optical fibre form, by way of example only, with reference to the accompanying drawings.

In the drawings.

DESCRIPTION OF THE PREFERRED EMBODIMENTS

Figure 1:
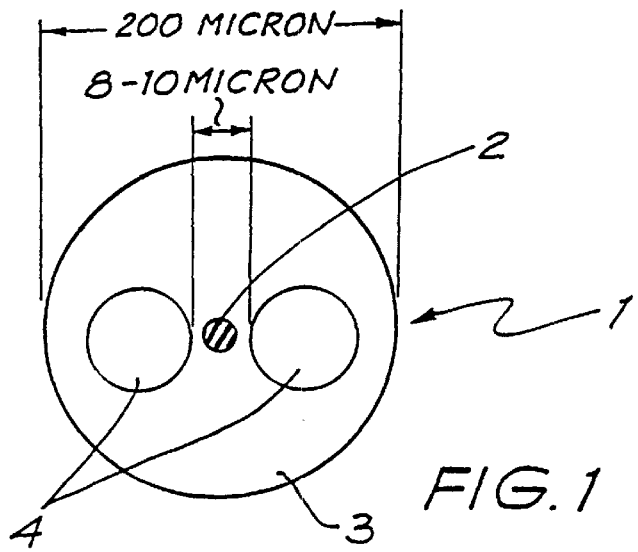
FIG. 1 is an end view of an optical fibre adapted for processing in accordance with an embodiment of the present invention.

With reference to the drawings, an optical fibre, generally designated by reference numeral 1, comprises a doped silica glass core 2, surrounded by a cladding 3 of silica or doped silica glass. The silica glass core 2 was doped (prior to drawing out the fibre 1). Dopants used in this example were concentrations of 12 mol % Ge, 3 mol % Al and 350 ppm of Er.

The optical fibre 1 was drawn out with a pair of hollow channels 4 bracketing the optical fibre 2.

Figure 2:
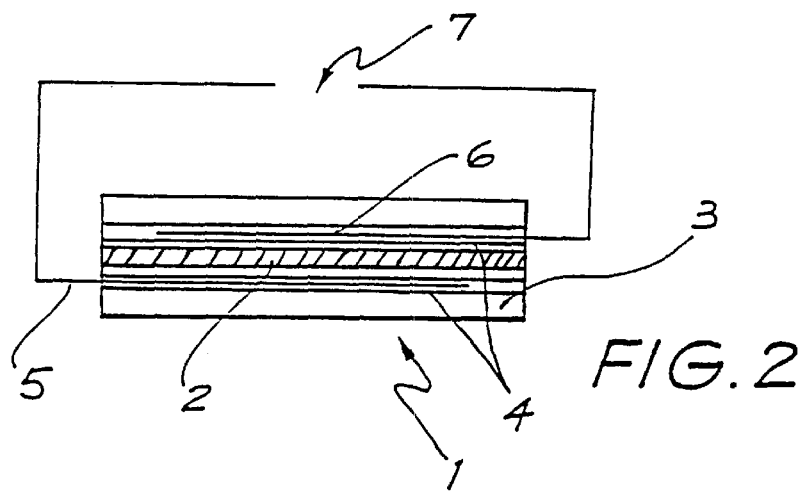
FIG. 2 is a side view of the optical fibre of FIG. 1, having electrodes inserted within the optical fibre cladding.

Fine wire electrodes 5, 6 (FIG. 2), in the order of 3–4 cm long were inserted in the channels 4 so that they lay alongside the core 2 slightly spaced therefrom. The dimensions specified in the drawings being exemplary only.

The electrodes 5 and 6 were excited by the application of an electrical poling field at a strength of approximately 80 V/$\mu$m while radiation of a wavelength of 193 nm at a power of 35 mJ/cm$^2$ was focused transversely onto the fibre core at a rate of 10 pps (pulse per second), from a pulsed laser source 9, for around 10 minutes.

This treatment produced a significant apparently linear electro-optic coefficient of around 6 pm/V in the doped silica glass, far more significant than that reported by Bergot et al.

The application of the ultra violet electromagnetic radiation and the electric field may be varied to create numerous types of devices with pre-determined properties. Further, the presence of electrodes adjacent the fibre optic core enables their subsequent use in the application of a modulating electric field.

Figure 3:
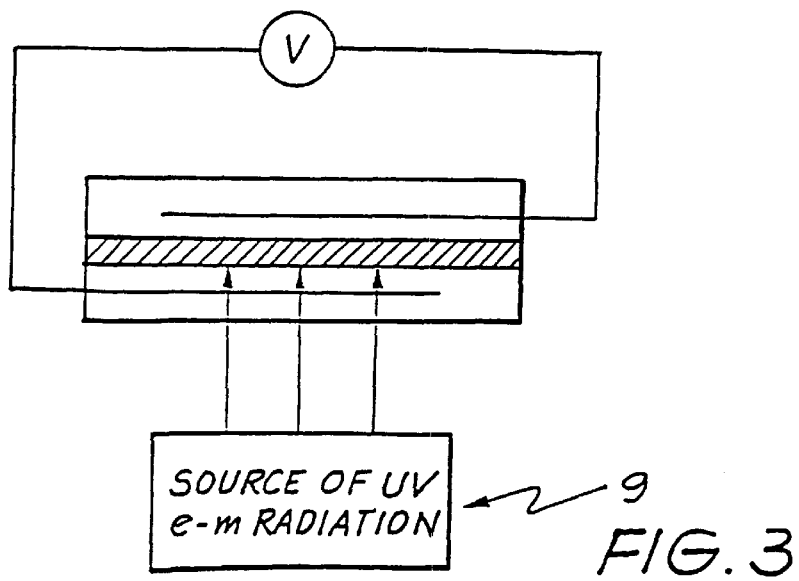
FIG. 3 shows a method of applying the ultra violet electromagnetic radiation to the core of an optical fibre.

FIG. 3 shows the preferred method of applying the UV electromagnetic radiation to a core of an optical fibre in a direction transverse to the direction of propagation of light through the optical fibre.

In a second embodiment, a poled Bragg grating having a periodic structure was created. A fibre was constructed in accordance with FIG. 1 however, this time the fibre had an outside diameter of 300 $\mu$m. The diameter of hollow channels 4 was 70 $\mu$m with the two hollow channels 4 being separated by 18 $\mu$m and a central core 2 having an 8 $\mu$m diameter being located between the two hollow channels 4. Two electrodes, having diameters 50 $\mu$m were inserted into the optical fibre having a length of approximately 6 cm. A voltage was applied between the electrodes so as to set up an electric field strength of approximately 100 V/$\mu$m.

The structure was then irradiated at 240 nm from an excimer pumped frequency doubled dye laser for about 1 hour at 0.8 mJ (25 mJ/cm$^2$) and at 20 Hz. The laser irradiation was passed through a phase mask (not shown) so as to create a periodic pattern of irradiation corresponding to a Bragg grating structure having an in fibre reflection wavelength in the region of 1.53 $\mu$m. The resulting tunable Bragg grating reflector was modulated by applying up to +/−300 V to the electrodes and Reflectivity changes of approximately 15 dB and Bragg wavelength shifts of approximately 0.5 nm were observed. These observations being consistent with an induced electro-optic coefficient of approximately 1 pm/V in the nominally unexposed regions and approximately 10 pm/V in the exposed regions.

The foregoing description of the preferred embodiments is by way of illustration only. Modifications, obvious to those skilled in the art can be made thereto without departing from the scope of the invention.

We claim:

1. A method for inducing or enhancing electro-optic properties in an optically transmissive silica or silicate material comprising substantially simultaneously applying a separate electric field to the material and subjecting the material to incident ultraviolet electromagnetic radiation.

2. A method for inducing or enhancing electro-optic properties in an optically transmissive silica or silicate material comprising applying an electric field to the material and subjecting the material to incident ultraviolet electromagnetic irradiation wherein said electric field has a frequency less than that of visible light.

3. A method as claimed in claim 1 or 2 wherein said optically transmissive silicate material is adapted to allow a first direction of transmission of an optical electromagnetic signal and said incident ultra violet electromagnetic radiation is applied substantially transverse to said first direction.

4. A method as claimed in claim 3 wherein said material comprises an optical fibre and said first direction is substantially along a transmission axis of said optical fibre.

5. A method as claimed in claim 1 or 2 wherein said ultra violet electromagnetic radiation is substantially absorbed by said material.

6. A method as claimed in claim 5 wherein the absorption length of said material is substantially one half the thickness of said optically transmissive material.

7. A method as claimed in claim 1 or 2 wherein said ultra violet radiation is between 150 and 400 nanometres.

8. A method as claimed in claim 1 or 2 wherein said ultra violet radiation is between 150 and 350 nanometres.

9. A method as claimed in claim 1 or 2 wherein said ultra violet radiation is substantially equal to 240 nanometres.

10. A method as claimed in claim 1 or 2 wherein said ultra violet radiation is substantially equal to 193 nm.

11. A method as claimed in claim 1 or 2 wherein said material comprises a silicate optical waveguide.

12. A method as claimed in claim 11 wherein said silicate optical waveguide comprises an optical fibre having a doped core.

13. A method as claimed in claim 12 wherein said ultra violet electromagnetic radiation is substantially absorbed by said silicate optical waveguide and the absorption length of said optical waveguide is substantially within an order of magnitude of the diameter of said core.

14. A method as claimed in claim 11 wherein said silicate optical waveguide is doped with a doping compound which includes at least one metal oxide selected from the groups IA to VA, IB to IVB, the transition metals, rare earths and actinides.

15. A method as claimed in claim 14 wherein said doping compound is selected from the group of $P_2O_5$, germanium, aluminium, boron and erbium.

16. A method as claimed in claim 11 further comprising storing said silicate optical waveguide in a hydrogen atmosphere.

17. A method as claimed in claim 1 or 2 wherein said material comprises a planar waveguide.

18. A method as claimed in claim 17 wherein said electric field is created by at least two electrodes buried in a surface of said planar waveguide.

19. A method as claimed in claim 17 wherein said electric field is created by at least two electrodes exposed on a surface of said planar waveguide and said planar waveguide is placed in a vacuum or high pressure gas to avoid electrical breakdown of the atmosphere surrounding said electrodes.

20. A method as claimed in claim 3 wherein said electric field is applied substantially transverse to the direction of said optical electromagnetic signal.

21. A method as claimed in claim 1 or 2 wherein the strength of said electric field is substantially in the range of 1 to 1000 Volts/Micrometer.

22. A method as claimed in claim 1 or 2 wherein the strength of said electric field is substantially in the range of 10 to 150 Volts/Micrometer.

23. A method as claimed in claim 1 or 2 wherein the strength of said electric field is approximately 100 Volts/Micrometer.

24. A method as claimed in claim 12 wherein said electric field is created by at least two electrodes and wherein an anode electrode is in close proximity with said doped core.

25. A method as claimed in claim 24 wherein said at least two electrodes are contained in a plane which is displaced with respect to a plane containing the axis of the fibre.

26. A method as claimed in claim 1 or 2 wherein said electric field is applied substantially at the same time as said electromagnetic radiation.

27. A method as claimed in claim 1 or 2 wherein the intensity or phase of said ultra violet electromagnetic radiation is subjected to variation in time.

28. A method as claimed in claim 1 or 2 wherein the intensity or phase of said ultra violet electromagnetic radiation is subjected to variation over different portions of said optically transmissive material.

29. A method as claimed in claim 1 or 2 wherein said material comprises one of the group fluorozirconate glass or chalcogenide glass.

30. A method as claimed in claim 3, wherein said method is utilised for second harmonic generation of said optical electromagnetic signal.

31. A method as claimed in claim 30 wherein said second harmonic generation of said optical electromagnetic signal is quasi-phase matched.

32. A method as claimed in claim 1 or 2 wherein said electric field comprises the oscillating electric field of electromagnetic radiation.

33. A method as claimed in claim 32 wherein said oscillating electric field is utilised to generate higher optical harmonics of light passing through said material.

34. A method as claimed in claim 32 wherein said oscillating electric field is utilised to generate light having sum and difference frequencies of the frequency of light passing through said material.

35. A method as claimed in any previous claim 1 to 34 wherein said inducing or enhancing electro-optic properties includes producing a substantially linear electro-optic coefficient of at least 1 picometre per volt.

36. A method as claimed in claim 35 wherein said electro-optic coefficient is at least 5 picometres per volt.

37. A method as claimed in claim 35 wherein said electro-optic coefficient is substantially 6 picometres per volt.

38. A device having electro-optic properties comprising an optically transmissive silica or silicate material being altered to create predetermined electrooptic properties by means of substantially simultaneously subjecting said material to a separate electric field by an electric field creation means and ultra violet radiation by an ultraviolet radiation source so as to create said predetermined electro-optic properties.

39. A device having electro-optic properties comprising an optically transmissive silica or silicate material being altered to create predetermined electro-optic properties by ineans of subjecting said material to an electric field by an electric field creation means and ultraviolet radiation by an ultra violet radiation source so as to create said field having a frequency less-than that of visible light.

40. A device as claimed in claim 38 or 39 where said ultra violet radiation source emits ultra violet radiation substantially transverse to the intended path of light to be transmitted through said material.

41. A device as claimed in claim 40 wherein said material comprises an optical fibre and said light transmitted through said material is transmitted substantially along a transmission axis of said optical fibre.

42. A device as claimed in claim 38 or 39 wherein said ultra violet electromagnetic radiation is substantially absorbed by said material.

43. A device as claimed in claim 42 wherein the absorption length of said material is substantially one half the thickness of said material.

44. A device as claimed in claim 38 or 39 wherein said ultra violet radiation is between 150 and 400 nanometres.

45. A device as claimed in claim 38 or 39 wherein said ultra violet radiation is between 150 and 350 nanometres.

46. A device as claimed in claim 38 or 39 wherein said ultra violet radiation is substantially equal to 240 nanometres.

47. A device as claimed in claim 38 or 39 which said ultra violet radiation is substantially equal to 193 nm.

48. A device as claimed in claim 38 or 39 wherein said material comprises a silicate optical waveguide.

49. A device as claimed in claim 48 wherein said silicate optical waveguide comprises an optical fibre having a doped core.

50. A device as claimed in claim 49 wherein the absorption length of said core is substantially equal to ten times the thickness of said core.

51. A device as claimed in claim 48 wherein said silicate optical waveguide is doped with a doping compound which includes at least one metal oxide selected from the groups IA to VA, IB to IVB, the transition metals, rare earths and actinides.

52. A device as claimed in claim 51 wherein said doping compound is selected from the group of $P_2O_5$, germanium, aluminium, boron and erbium.

53. A device as claimed in claim 48 wherein said silicate optical waveguide is stored in a hydrogen atmosphere.

54. A device as claimed in claim 38 or 39 wherein said material comprises a planar waveguide.

55. A device as claimed in claim 54 wherein said electric field is created by at least two electrodes buried in a surface of said planar waveguide.

56. A device as claimed in claim 54 wherein said electric field creation means comprises at least two electrodes exposed on a surface of said planar waveguide and said planar waveguide is placed in a vacuum or high pressure atmosphere to avoid electrical breakdown of the atmosphere surrounding said electrodes.

57. A device as claimed in claim 40 wherein said electric field is applied substantially transverse to the direction of the intended path of light to be transmitted through said material.

58. A device as claimed in claim 38 or 39 wherein the strength of said electric field is substantially in the range of 1 to 1000 Volts/Micrometer.

59. A device as claimed in claim 38 or 39 wherein the strength of said electric field is substantially in the range of 10 to 150 Volts/Micrometer.

60. A device as claimed in claim 38 or 39 wherein the strength of said electric field is approximately 100 Volts/Micrometer.

61. A device as claimed in claim 49 wherein said electric field creation means comprises at least two electrodes and wherein an anode electrode is in contact with aid doped core.

62. A device as claimed in claim 61 wherein said at least two electrodes are contained in a plane which is displaced with respect to a plane containing the axis of the fibre.

63. A device as claimed in claim 38 or 39 wherein said electric field creation means creates said electric field substantially at the same time as said ultra violet irradiation by said ultraviolet radiation source.

64. A device as claimed in claim 38 or 39 wherein the intensity or phase of said ultra violet electromagnetic radiation is subjected to variation in time.

65. A device as claimed in claim 38 or 39 wherein the intensity or phase of said ultra violet electromagnetic radiation is subjected to variation over different portions of said material.

66. A device as claimed in claim 38 or 39 wherein said material comprises one of the group fluorozirconate glass, or chalcogenide glass.

67. A device as claimed in claim 40 wherein said device is utilized for second harmonic generation of an optical electromagnetic signal.

68. A device as claimed in claim 67 wherein said second harmonic generation of said optical electromagnetic signal is quasi-phase matched.

69. A device as claimed in claim 38 or 39 wherein said material is subjected to further irradiation by an oscillating electric field of electromagnetic radiation when in use.

70. A device as claimed in claim 69 utilised to generate higher optical harmonics of light passing through said material.

71. A device as claimed in claim 69 wherein said oscillating electric field is utilised to generate light having sum and difference frequencies of the frequency of light passing through said material.

72. A device as claimed in any previous claims 38 to 70 wherein said electro-optic properties includes a substantially linear electro-optic coefficient of at least 1 picometre per volt.

73. A device as claimed in claim 72 wherein said electro-optic coefficient is at least 5 picometres per volt.

74. A device as claimed in claim 73 wherein said electro-optic coefficient is substantially 6 picometres per volt.

* * * * *